United States Patent [19]
Karis et al.

[11] Patent Number: 5,940,247
[45] Date of Patent: Aug. 17, 1999

[54] MAGNETIC RECORDING DEVICE WITH SPINDLE MOTOR LUBRICANT OF SPECIFIED AMINE AND CARBAMATE CONCENTRATIONS/RATIOS

[75] Inventors: Thomas Edward Karis, San Martin; Holavanahally Seshachar Nagaraj, Morgan Hill, both of Calif.

[73] Assignee: International Business Machines Corporation, Armonk, N.Y.

[21] Appl. No.: 08/824,667

[22] Filed: Mar. 26, 1997

[51] Int. Cl.⁶ ............................. G11B 19/00; H02K 5/16
[52] U.S. Cl. ..................... 360/99.08; 310/67 R; 310/90
[58] Field of Search ................ 360/99.08, 99.04, 360/98.07; 252/32.7 E, 51.5 R; 310/67 R, 90

[56] References Cited

U.S. PATENT DOCUMENTS

| | | | |
|---|---|---|---|
| 2,201,258 | 5/1940 | Busse | 87/9 |
| 2,370,552 | 2/1945 | Lincoln et al. | 260/648 |
| 2,385,964 | 10/1945 | Bergen | 252/47 |
| 2,651,616 | 9/1953 | Matthews et al. | 252/41 |
| 2,718,501 | 9/1955 | Harle | 252/47 |
| 2,781,318 | 2/1957 | Cyphers | 252/47 |
| 2,844,536 | 7/1958 | Morway | 252/39 |
| 2,999,813 | 9/1961 | Givens et al. | 252/33.6 |
| 3,278,430 | 10/1966 | Williams | 252/33.6 |
| 3,347,791 | 10/1967 | Thompson et al. | 252/33.6 |
| 3,462,367 | 8/1969 | Booher | 252/33.2 |
| 3,666,716 | 5/1972 | Wheeler | 260/45.9 R |
| 3,801,506 | 4/1974 | Cross et al. | 252/40 |
| 3,925,215 | 12/1975 | Jervis et al. | 252/47.5 |
| 4,213,868 | 7/1980 | Bitely, Jr. et al. | 252/11 |
| 4,308,154 | 12/1981 | Clason et al. | 252/32.7 E |
| 4,417,990 | 11/1983 | Clason et al. | 252/32.7 E |
| 4,424,136 | 1/1984 | Barreiro et al. | 252/41 |
| 4,466,894 | 8/1984 | Grover | 252/32.7 E |
| 4,517,103 | 5/1985 | Hoffmane t al. | 252/28 |
| 4,536,308 | 8/1985 | Pehler et al. | 252/32.7 E |
| 4,556,476 | 12/1985 | Miller et al. | 208/48 AA |
| 4,841,393 | 6/1989 | Macleod et al. | 360/98.07 |
| 4,842,752 | 6/1989 | Hardy et al. | 252/17 |
| 4,894,738 | 1/1990 | Elsasser et al. | 360/97.01 |
| 4,897,210 | 1/1990 | Newsoroff | 252/41 |
| 4,908,143 | 3/1990 | Dumdum et al. | 252/17 |
| 4,990,272 | 2/1991 | Morita et al. | 252/41 |
| 5,032,300 | 7/1991 | O'Neil | 252/51.5 R |
| 5,133,900 | 7/1992 | Gallacher et al. | 252/400.52 |
| 5,152,908 | 10/1992 | Tipton | 252/32.7 E |
| 5,213,699 | 5/1993 | Babiarz et al. | 252/50 |
| 5,275,749 | 1/1994 | Kugel et al. | 252/51.5 R |
| 5,296,981 | 3/1994 | Ogawa | 360/99.08 |
| 5,448,119 | 9/1995 | Kono et al. | 310/67 R |
| 5,502,605 | 3/1996 | Myoken | 360/99.08 |
| 5,596,235 | 1/1997 | Yazaki et al. | 310/67 R |

OTHER PUBLICATIONS

C. P. Roger Ku, "Investigation of Hydrodynamic Bearing Friction in Data Storage Information System Spindle Motors", ISPS–vol. 1, Advances in Information Storage and Processing Systems, ASME 1995, pp. 159–165.

*Primary Examiner*—Craig A. Renner
*Attorney, Agent, or Firm*—Robert B. Martin; John J. Gresens

[57] ABSTRACT

A magnetic recording data storage device includes a magnetic recording disk, a spindle motor, a head supported on an air bearing carrier and an actuator connected to the head carrier for moving the head across the rotating disk. The spindle motor has lubricant covered ball bearings where the lubricant includes an alkali hydroxystearate, an ester oil, a dialkyldiphenylamine and a dialkyldithiocarbamate.

12 Claims, 3 Drawing Sheets

MAGNETIC RECORDING DEVICE WITH SPINDLE MOTOR LUBRICANT OF SPECIFIED AMINE AND CARBAMATE CONCENTRATIONS/RATIOS

FIELD OF THE INVENTION

The present invention relates to a magnetic recording device having an improved spindle motor lubricant.

BACKGROUND OF THE INVENTION

Current growth rates for the digital magnetic recording data storage industry show a significant annual increase in recording densities and transfer rate and a decrease in seek time. To continue on this growth rate curve, the recording industry is being forced to make a number of significant changes in the design and operation of the magnetic recording device. Digital magnetic recording devices for data storage generally comprise a thin film magnetic recording disk, a spindle motor for rotating the disk, and a head or transducer which is moved along or above the surface of the rotating disk to read and write information on the disk. The thin film magnetic recording disks generally comprise a substrate, a magnetic layer such as a cobalt-based metal alloy, a protective amorphous carbon layer and a layer of perfluoropolyether disposed on the carbon overcoat. The magnetic recording disks are mounted on a spindle motor which rotates the disk at a high rotational speed. The spindle motor generally comprises (i) a spindle shaft attached to a housing (ii) a spindle hub rotatably mounted on the shaft and (iii) lubricant covered ball bearings positioned in races formed in the shaft and/or hub.

The head or transducer is attached to a carrier or slider having an air bearing surface which is supported during operation adjacent the data surface of the disk by a cushion of air generated by the rotating disk.

The recording device also comprises a positioning actuator connected to the carrier for moving the head to the desired location on the disk during reading or writing operations.

Conventional magnetic recording devices are operated at a rotational speed of about 3600 RPM to 7000 RPM. It has been discovered that during normal operation of the disk drive at higher rotational speeds e.g., greater than 7500 RPM, the recording device begins to undergo acoustic vibrations associated with chemical breakdown of the spindle bearing grease lubricant within a short period of time. Continued operation of the recording device in the presence of the acoustic vibrations leads to mechanical failure of the spindle bearing.

It is an object of the present invention to provide an improved magnetic recording device which operates for extended periods of time at higher rotational speeds without unacceptable acoustic vibrations.

Other objects and advantages will be apparent from the following disclosure.

SUMMARY OF THE INVENTION

The present invention relates to a digital magnetic recording data storage device which can operate effectively at high rotational speeds. The magnetic recording device of the present invention comprises (a) a magnetic recording disk (b) a spindle motor associated with the disk operable for rotating the disk at selected rotational speeds of from 3000 to greater than 7,000 RPM e.g., 10,000–20,000 RPM; (c) a head supported on an air bearing carrier (head and carrier are an integral member) for magnetically writing data to or magnetically reading data from the magnetic layer on the disk; and (d) an actuator connected to the head carrier for moving the head across the rotating disk. The brushless direct current spindle motor comprises (i) a spindle shaft attached to a housing, (ii) a spindle hub rotatably mounted on the shaft and (iii) lubricant covered ball bearings positioned in races formed in the shaft and/or hub. The improved lubricant comprises a thickener, an oil, a alkyldiphenylamine and a alkyldithiocarbamate. The lubricant improves the rotational operation of the disk drive.

A more thorough disclosure of the present invention is presented in the detailed description which follows and the accompanying figures.

DETAILED DESCRIPTION OF THE INVENTION

The present invention relates to an improved high performance digital magnetic recording device for reading and writing data magnetically.

Figure 1:
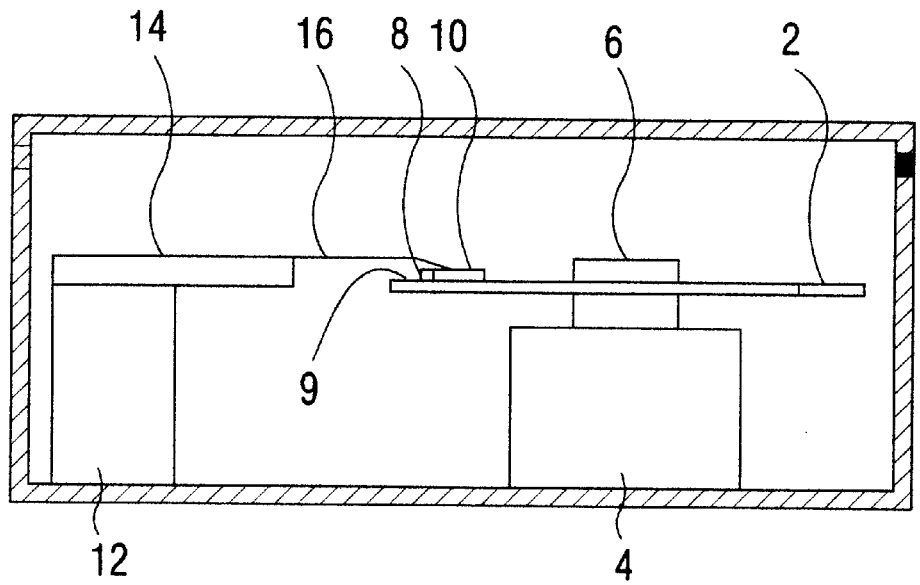
FIG. 1 is a section view of the magnetic recording disk drive.
Figure 2:
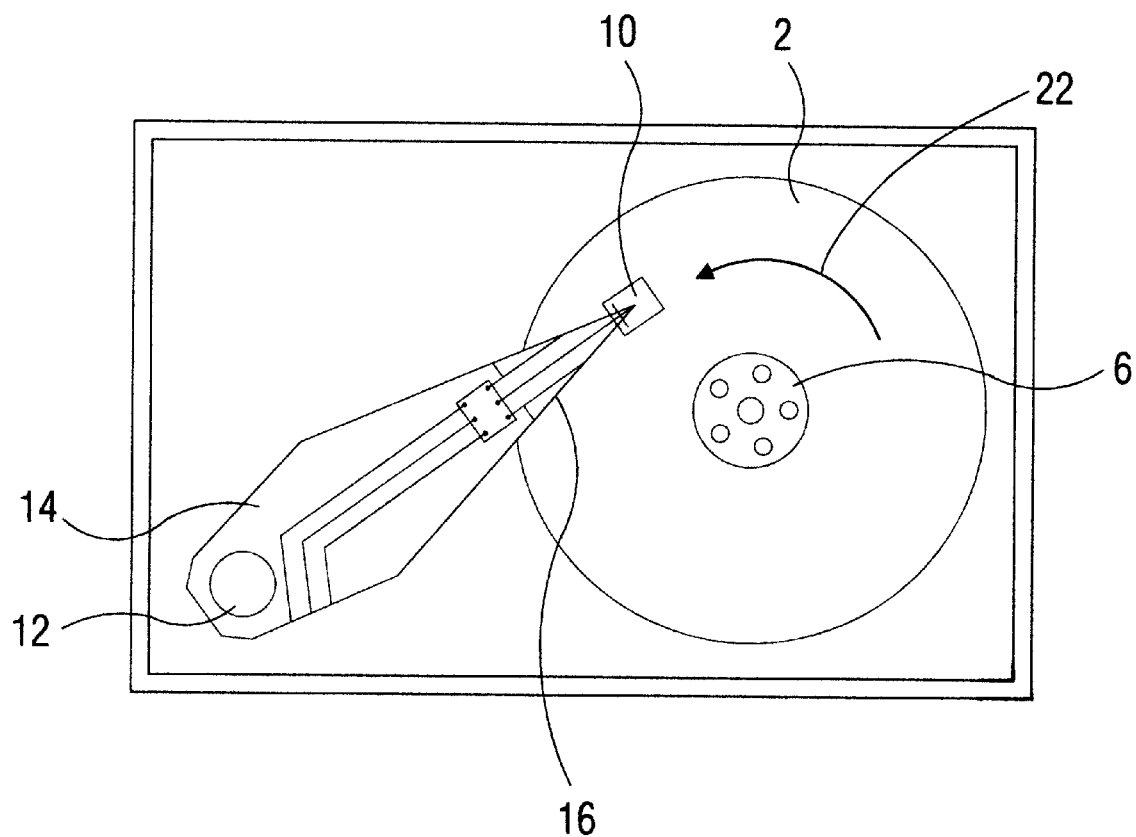
FIG. 2 is a top view of the magnetic recording disk drive.

Referring to FIGS. 1 and 2, there is shown a magnetic recording disk drive of the present invention. The magnetic recording disk 2 is rotated by spindle motor 4 with hub 6, which is attached to the drive motor. The disk generally comprises a substrate, a metallic magnetic layer, an optional carbon layer and a bonded or nonbonded polymeric layer, e.g., perfluoropolyether.

A read/write head or transducer 8 is formed on the trailing end of a carrier, or slider 10. Suitable sliders are positive or negative air bearing sliders. Suitable negative air bearing sliders are disclosed in U.S. Pat. Nos. 4,894,740 and 5,438,467 the disclosures of which are incorporated herein by reference. Head 8 may be an inductive read and write transducer or an inductive write transducer with a magnetoresistive read transducer. The slider 10, is connected to the actuator 12 by means of a rigid arm 14 and suspension 16. The suspension 16 provides a bias force which urges the slider 10 onto the surface a of the recording disk 2.

During operation of the disk drive, the spindle motor 4 rotates the disk 2 at a constant speed in the direction of arrow 22, and the actuator 12, which is typically a linear or rotary motion coil motor, moves the slider 10 generally radially across the surface of the disk 2 so that the read/write head may access different data tracks on disk 2.

Figure 3:
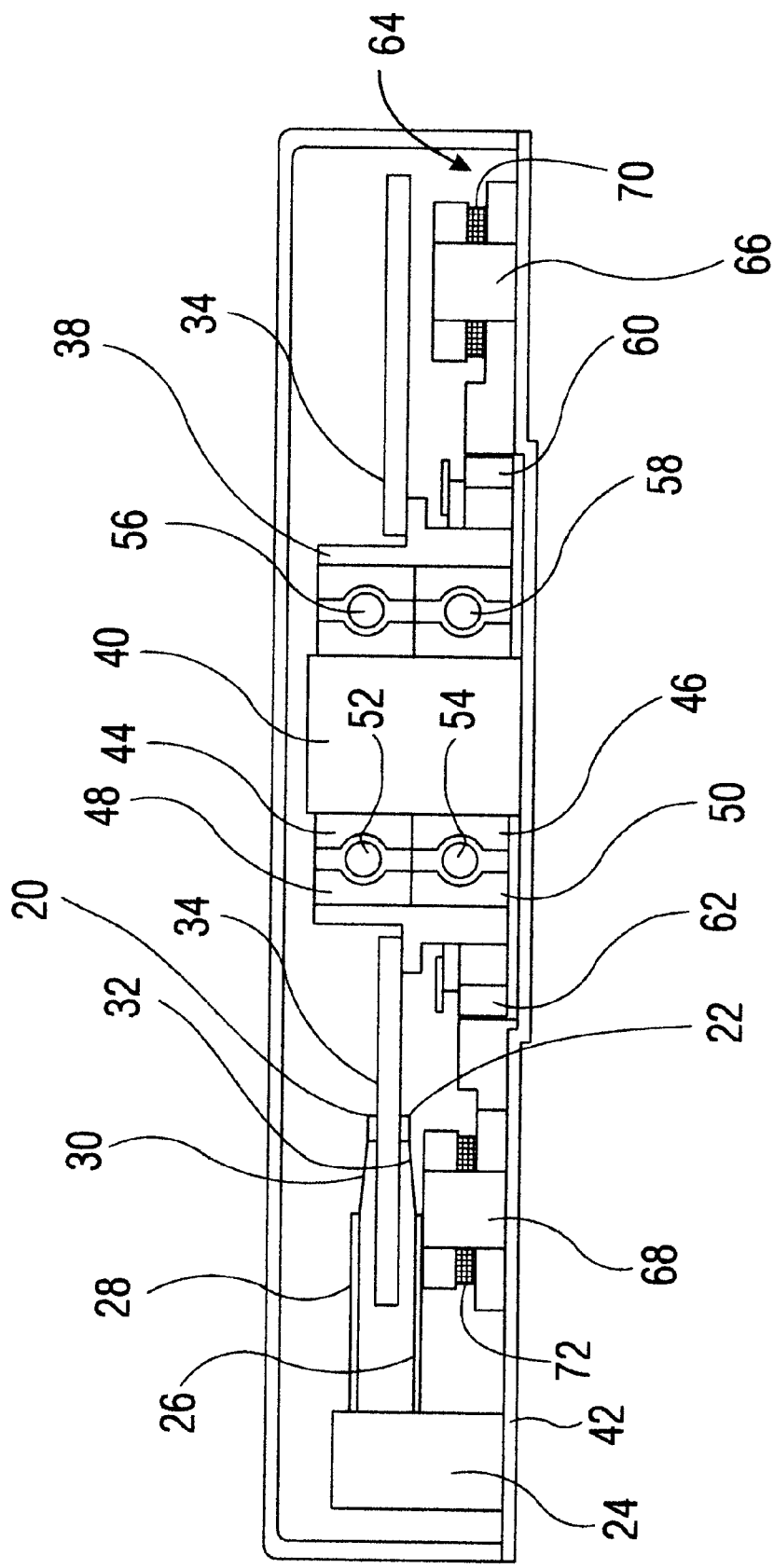
FIG. 3 is a cross sectional view of another embodiment of a magnetic recording device.

Referring to FIG. 3, heads 20 and 22 are connected to actuator 24 by means of arms 26 and 28 and suspensions 30 and 32. Disk 34 is supported on hub or rotor 38 which is rotably mounted on shaft 40. Shaft 40 is supported on housing 42. A plurality of permanent magnets (e.g., 60 and 62) as sections of an annular ring magnet are attached to hub 38. Stator 64 has a plurality of axial posts 66 and 68 and coils 70 and 72 disposed around the posts. Magnets 60 and 62 are preferably made of high moment magnetic material such as neodymuim-iron-boron or samarium-cobalt. The annular ring magnet comprises a plurality of individual magnet sections with magnetic fields which alternatively point radially outwardly and inwardly around the ring. When an electrical current is applied to each coil of the stator, a magnetic field is induced which attracts or repels the permanent magnet sections to cause rotation of the hub.

Figure 4:
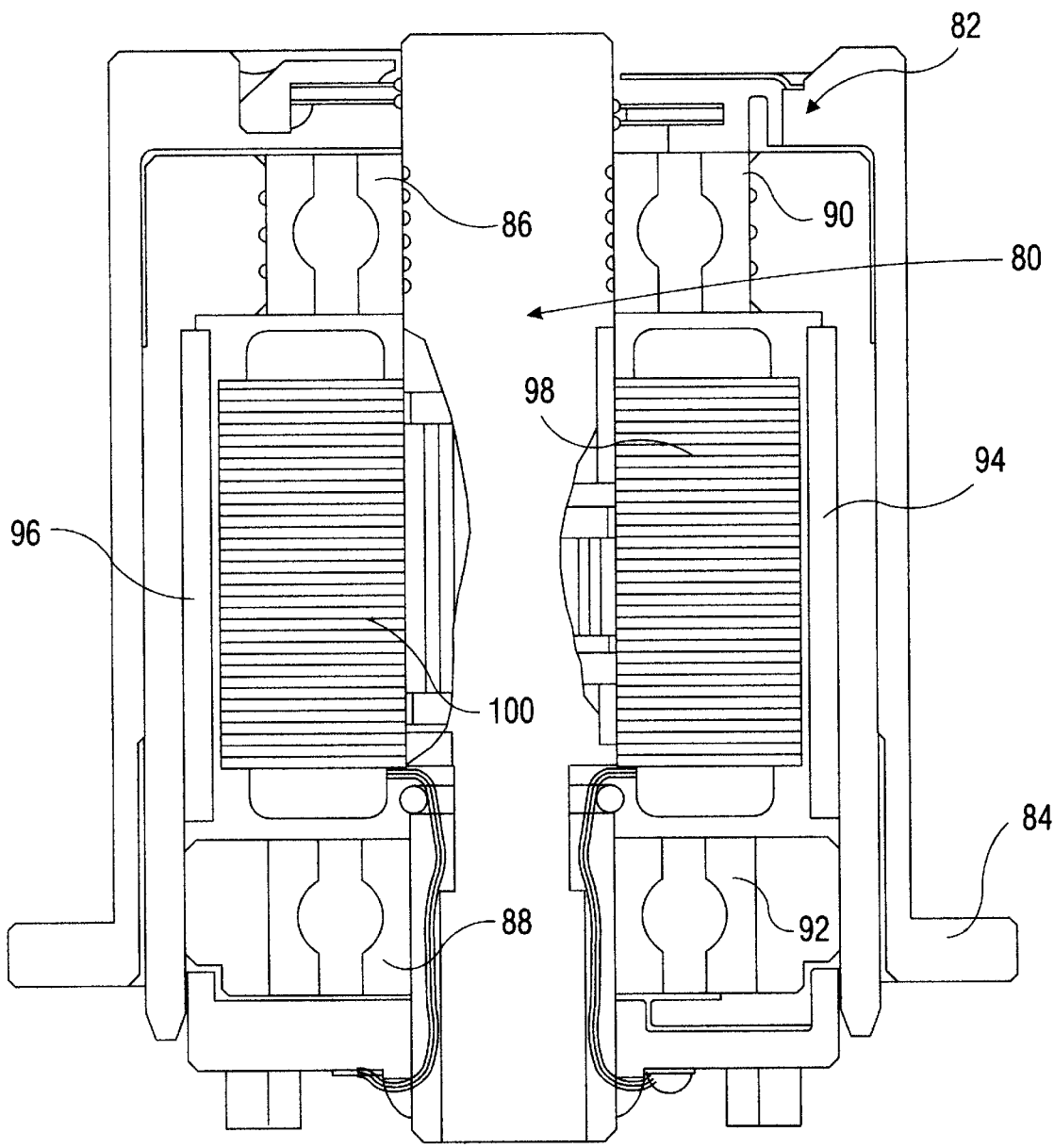
FIG. 4 is a cross sectional view of another embodiment of a spindle motor.

An annular race is formed between hub 38 and shaft 40. Suitably the annular race comprises inner races 44 and 46 which are attached to and part of shaft 40 and outer races 48 and 50 which are attached to and part of hub 38. Ball bearings 52, 54, 56 and 58 are disposed in the annular race track formed by races 44, 46, 48 and 50. Referring to FIG. 4, there is shown an in-hub brushless D.C. spindle motor comprising shaft 80 and hub 82 having lip 84 for supporting the disk. The shaft has inner races 86 and 88 and hub has outer races 90 and 92. Permanent magnet sections 94 and 96 are attached to hub 80. Coils 98 and 100 of stator are attached to shaft 80. Other suitable spindle motors are known to those skilled in the art such as disclosed in U.S. Pat. Nos. 5,502,605; 4,841,393; 5,448,119; and 5,296,981, the disclosures of which are incorporated herein by reference for all purposes.

The annular race is filled with a unique lubricating grease which coats the ball bearings. The lubricant grease generally comprises a thickener, an oil, a di $C_{1-10}$ alkyl diphenyl amine and a di $C_{1-10}$ alkyldithiocarbamate.

The first component of the lubricant is an oil. Suitable oils include ester oils (e.g., synthetic ester oils) and mineral oils (e.g., polyalpha olefin oil). Preferably the oil is an ester oil. The ester oil may have chain branching and may have some unreacted hydroxyl groups. Suitable ester oils are di-$C_{1-10}$ alkyl (e.g., dioctyl, dibutyl, di ethyl hexyl) sebacate; pentaerythritol tetra esters of $C_{1-10}$ carboxylic acids; tri $C_{1-6}$ alkyl and trimethylol propane triheptanoate. Suitable ester oils have the formula: $C(CH_2OOC(CH_2)X\ CH_3)_4$ where x is 1–10. A preferred ester oil is pentaerythritol tetrapentanoate. The second component of the lubricant is the $C_{1-10}$ alkyl diarylamine. Suitable amines are $C_{2-10}$, alkylated diphenyl amine and akylated phenyl napthylamine. A preferred amine is di $C_{2-10}$ alkyl diphenyl amine e.g.; dioctyl diphenylamine. The third component of the lubricant is a transition metal di $C_{1-10}$ alkyl dithiocarbamate. A suitable carbamate is zinc diamyldithiocarbamate. Other suitable transition metals for the carbamate are copper, tin, antimony and cadmium. The last component of the lubricant is a thickener. Suitable thickener will be known to those skilled in the art such as fatty acid salts and polyurea. Suitable fatty acid surfactants include alkali or alkaline (e.g., lithium, sodium, calcium, barium) $C_{10}$–$C_{26}$ (preferably $C_{16-20}$) fatty acid salts optionally having one or more hydroxy substituents. A preferred surfactant is lithium hydroxystearate. Other surfactants include alkali palmitate and alkali icosanate ($C_{20}$).

Preferably the lubricant comprises about equal molar amounts of the amine and carbamate components e.g., $$\frac{\text{moles of amine/liter of oil}}{\text{moles of amine} + \text{moles of carbamate/liter of oil}}$$

is about 0.40 to 0.60 preferably about 0.45 to 0.55 more preferably about 0.48 to 0.52, most preferably about 0.5. Preferably the total moles amine and carbamate/liter of oil is greater than about 0.015, more preferably greater than about 0.02 and less than about 0.15 preferably less than about 0.10 and more preferably less than about 0.05.

Surprisingly, the synergistic interaction of the lubricant components enables long term high speed operation of the magnetic recording device without degradation of performance. Other minor components (e.g., less than 5 weight %) known to those skilled in the art can also be added to the lubricant such as antioxidants, metal deactivators, antiwear agents, corrosion inhibitors and other additives known to those skilled in the art.

The following examples are detailed descriptions of the present invention. The detailed descriptions fall within the scope of, and serve to exemplify, the more generally described invention set forth above. The examples are presented for illustrative purposes only, and are not intended as a restriction on the scope of the invention.

EXAMPLE

Several lubricant compositions were tested for stability. Each composition comprised the following components: zinc diamyldithiocarbamate, dioctyl diphenyl amine and an ester oil (a blend of pentaerythritol tetra pentanoate, hexanoate and heptanoate.) Five grams of the oil composition containing additives was placed in a 50 ml pyrex beaker and covered with tin foil. A 5 mm hole in the center of the tin foil allowed periodic sampling of the oil for analysis. In some of the tests clean ball bearings were immersed in the oil. The compositions were monitored by UV spectroscopy and failure was detected by sudden absorbance between 200–300 nm. The results are shown in Table 1. It can be seen from the results that compositions having about equal molar amounts of the carbamate and amine component exhibited synergistic improvement in stability.

TABLE 1

| Test No. | Ball Bearings | Mole/Liter Carbamate | Mole/Liter Amine | Moles/liter Amine + Carbamate | Mole Fraction DDA | Life (hrs) |
|---|---|---|---|---|---|---|
| 1 | 0 | 0.0000 | 0.0000 | 0.0000 | 0.00 | 140 |
| 2 | 4 | 0.0000 | 0.0000 | 0.0000 | 0.00 | 135 |
| 3 | 0 | 0.0109 | 0.0109 | 0.0218 | 0.50 | 4320 |
| 4 | 4 | 0.0047 | 0.0064 | 0.0111 | 0.57 | 630 |
| 5 | 4 | 0.0095 | 0.0127 | 0.0222 | 0.57 | >1800 |
| 6 | 4 | 0.0009 | 0.0025 | 0.0035 | 0.73 | 730 |
| 7 | 4 | 0.0009 | 0.0025 | 0.0035 | 0.73 | 940 |
| 8 | 4 | 0.0024 | 0.0064 | 0.0087 | 0.73 | 470 |
| 9 | 4 | 0.0047 | 0.0127 | 0.0174 | 0.73 | 510 |
| 10 | 4 | 0.0095 | 0.0254 | 0.0349 | 0.73 | 570 |
| 11 | 4 | 0.0047 | 0.0254 | 0.0301 | 0.84 | ppt216 |
| 12 | 4 | 0.0024 | 0.0127 | 0.0151 | 0.84 | 610 |
| 13 | 4 | 0.0091 | 0.0610 | 0.0700 | 0.87 | ppt216 |

Although this invention has been described with respect to specific embodiments, the details thereof are not to be construed as limitations for it will be apparent that various embodiments, changes and modifications may be resorted to without departing from the spirit and scope thereof, and it is understood that such equivalent embodiments are intended to be included within the scope of this invention.

What is claimed is:

1. A magnetic recording device for reading or writing magnetically, comprising:

(a) a magnetic disk;
   (b) a head supported on an air bearing slider for magnetically reading data from or magnetically writing data to the magnetic disk;
   (c) a spindle motor for holding the disk, comprising a shaft, a rotor and a plurality of bearings interposed between the shaft and rotor, the bearings coated with a lubricant comprising a thickener, an oil, alkyl diaryl amine and a transition metal $C_{1-10}$ alkyl dithiocarbamate where (moles of amine/liter of oil) divided by (moles of amine and carbamate/liter of oil) is about 0.40 to 0.60 and moles of amine and carbamate/liter of oil is greater than 0.015 moles/liter; and (d) an actuator connected to the slider for moving the head across the disk.

2. The device of claim 1 wherein the thickener is alkali hydroxystearate.

3. The device of claim 2 wherein the oil is an ester oil.

4. The device of claim 3 wherein the ester oil is di-$C_{1-10}$ alkyl sebacate, pentaerythritol tetra $C_{2-10}$ alkanoate, triesters of trimellitic acid or trimethylol propane triheptanoate.

5. The device of claim 4 wherein the ester oil is pentaerythritol tetra $C_{2-4}$ alkanote.

6. The device in claim 3 wherein the transition metal is selected from zinc, copper, tin, antimony or cadmium.

7. The device of claim 6 wherein the dithiocarbamate is zinc diamyldithiocarbamate.

8. The device of claim 3, wherein said ester oil comprises a $C_{1-10}$ alkyl diaryl amine.

9. The device of claim 8 wherein the $C_{1-10}$ alkyl diaryl amine is $C_{1-10}$ di alkyl diphenyl amine or $C_{1-10}$ dialkyl phenyl napthylamine.

10. The device of claim 9 wherein the $C_{1-10}$ alkyl diaryl amine is dioctyl diphenyl amine.

11. A magnetic recording device for reading or writing magnetically, comprising:

(a) a magnetic disk;

(b) a head supported on an air bearing slider for magnetically reading data from or magnetically writing data to the magnetic disk;

(c) a spindle motor for holding the disk, comprising a shaft, a rotor and a plurality of bearings positioned in an annular race formed between the shaft and rotor, the bearings coated with a lubricant comprising lithium hydroxystearate, ester oil, dioctyl diphenyl amine and zinc diamyl dithiocarbamate where (moles of amine/liter of oil) divided by (moles of amine and carbamate/liter of oil) is about 0.40 to 0.60 and moles of amine and carbamate/liter of oil is greater than 0.015 moles/liter; and (d) an actuator connected to the slider for moving the head across the disk.

12. The device of claim 11 wherein the ester oil is pentaerythritol tetra $C_{4-8}$ alkanoate.

\* \* \* \* \*